Dec. 31, 1935.   A. ZISKA   2,026,080
ENAMEL SPRAYING BOOTH
Filed March 7, 1932   5 Sheets-Sheet 1
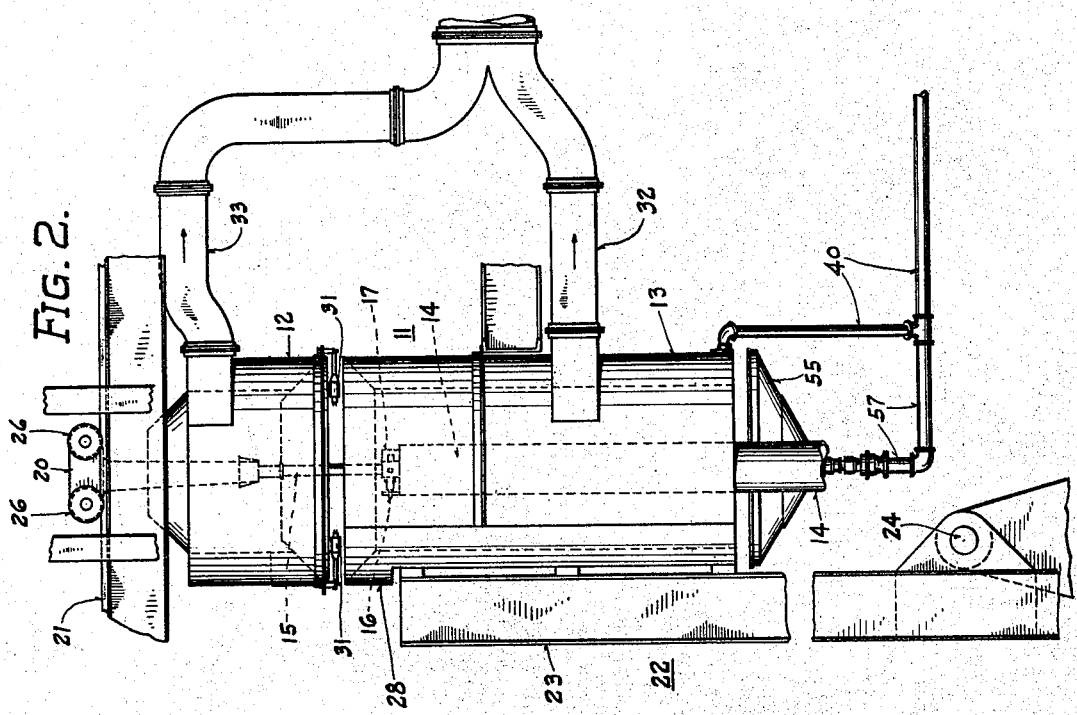
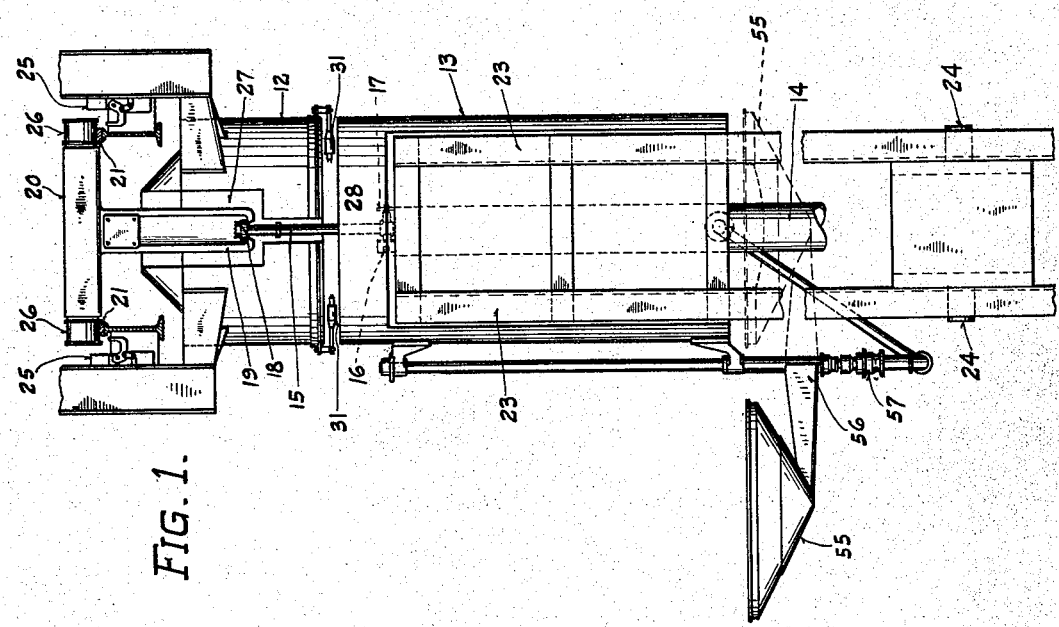
INVENTOR.
Adam Ziska
BY
ATTORNEY.

Dec. 31, 1935. A. ZISKA 2,026,080
ENAMEL SPRAYING BOOTH
Filed March 7, 1932  5 Sheets-Sheet 2

INVENTOR.
Adam Ziska
BY
ATTORNEY.

Dec. 31, 1935.  A. ZISKA  2,026,080
ENAMEL SPRAYING BOOTH
Filed March 7, 1932   5 Sheets-Sheet 3

INVENTOR.
Adam Ziska
BY
ATTORNEY.

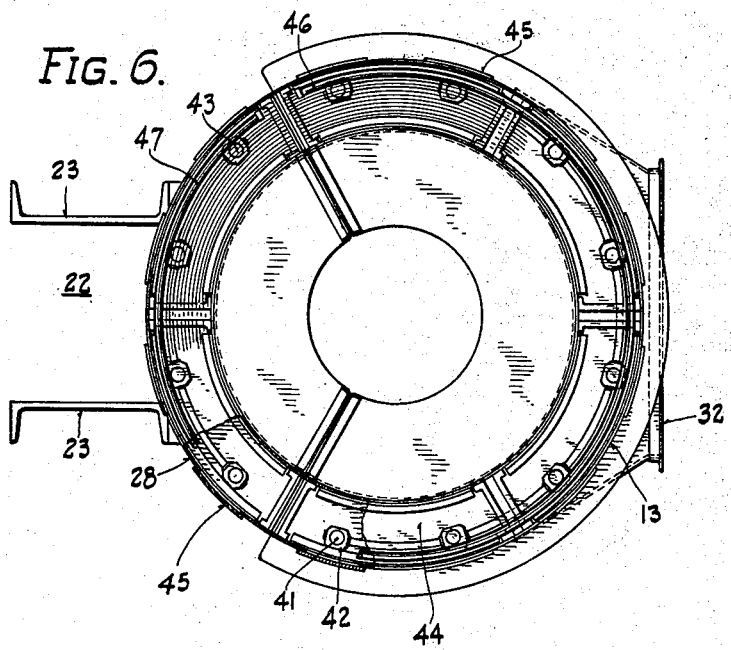
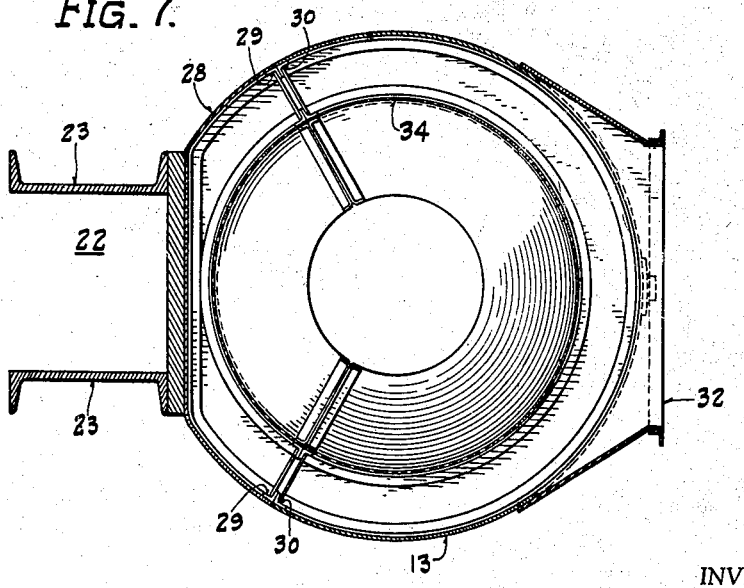

Dec. 31, 1935.  A. ZISKA  2,026,080

ENAMEL SPRAYING BOOTH

Filed March 7, 1932  5 Sheets-Sheet 5

INVENTOR.
Adam Ziska
BY
ATTORNEY.

Patented Dec. 31, 1935

2,026,080

UNITED STATES PATENT OFFICE 2,026,080

ENAMEL SPRAYING BOOTH

Adam Ziska, Wauwatosa, Wis., assignor to A. O. Smith Corporation, Milwaukee, Wis., a corporation of New York Application March 7, 1932, Serial No. 597,249

19 Claims. (Cl. 91—60)

The present invention relates generally to an enamel spraying booth and particularly to a booth for use in spraying the exterior of tubular articles with an enamel mixture.

The object of the invention is to provide for giving the atmosphere in an enamel spraying booth a radial movement outwardly to prevent the enamel mixture delivered by one gun from interfering with the jets of enamel mixture delivered by other guns.

It is also an object of the invention to provide for drawing air out of an enamel spraying booth at a rate substantially equal to the rate at which it enters as a result of the spraying operations to prevent the building up of a pressure in the booth, and to maintain a state of substantial pressure equilibrium in the booth.

Another object of the invention is to provide for controlling the movements of the air within a spray enameling booth to cause it to move along predetermined lines.

Other objects of the invention will be apparent from the following description and claims when read in conjunction with the accompanying drawings, in which:

Figure 1 is a view in side elevation of the spraying booth made in accordance with the present invention;

Fig. 2 is a view in side elevation of the spraying booth taken at right angles to that shown in Fig. 1;

Fig. 6 is a cross-sectional view of the apparatus taken on the line 6—6 of Fig. 3;

Fig. 7 is a cross-sectional view taken on the line 7—7 of Fig. 3;

Figure 3:
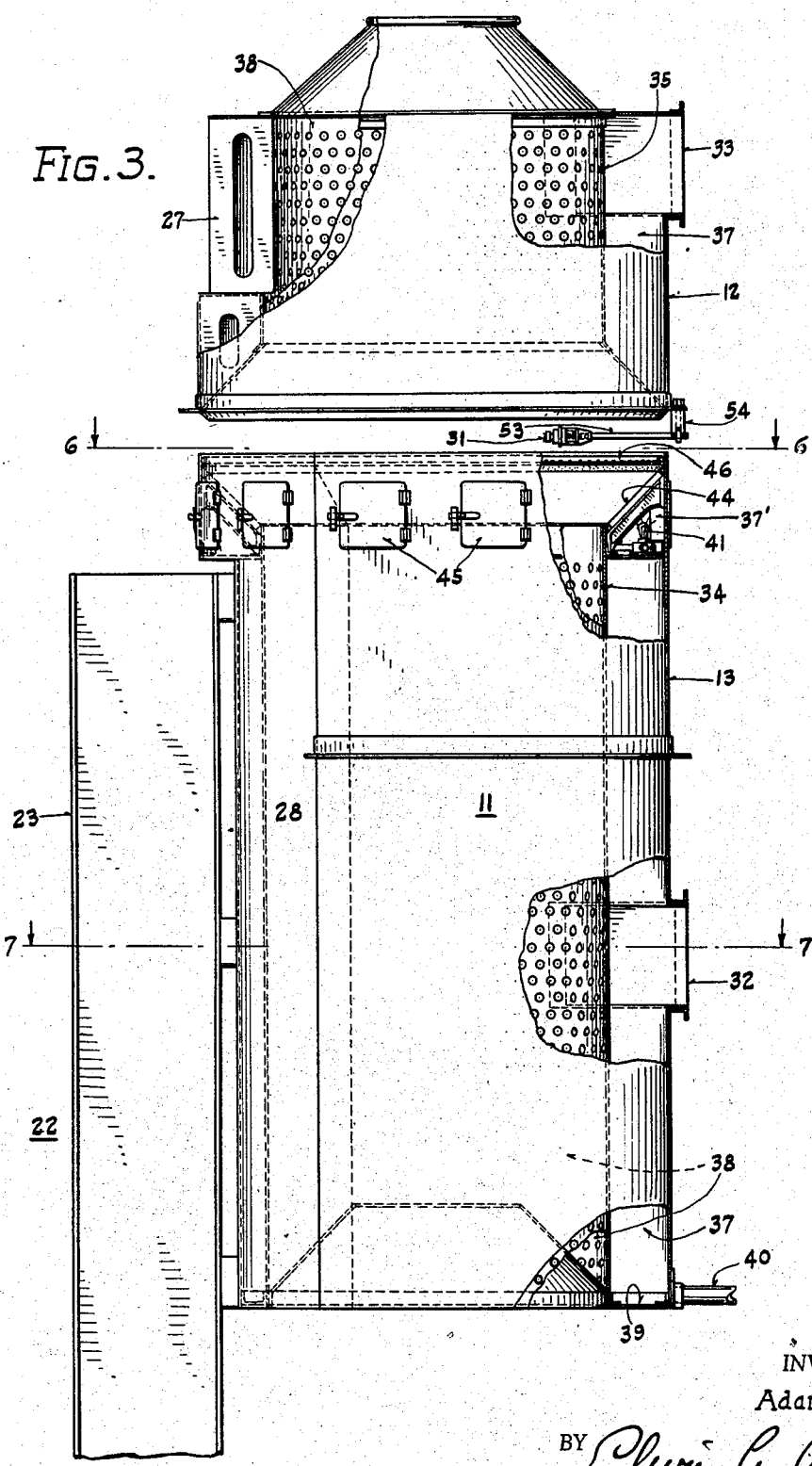
Fig. 3 is also a view in side elevation of the spraying booth, parts being broken away to show details of construction.
Figure 5:
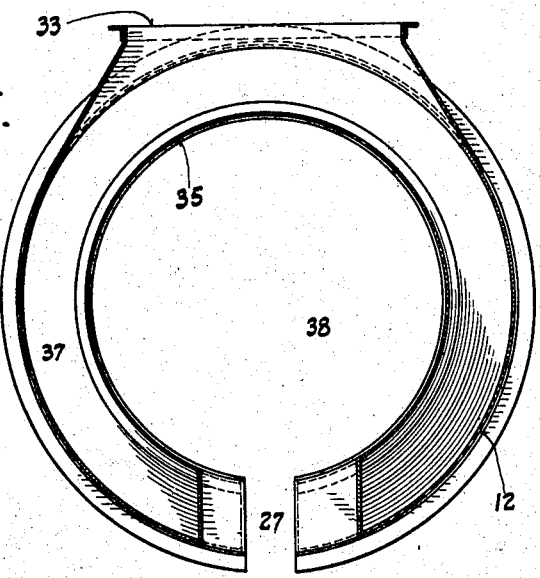
Fig. 5 is a cross-sectional view taken on the line 5—5 of Fig. 4.
Figure 4:
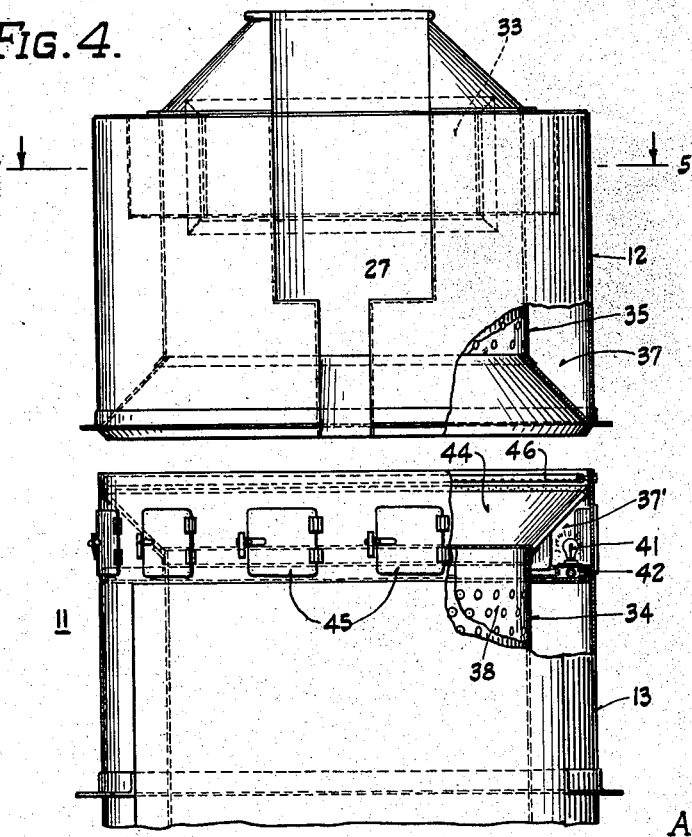
Fig. 4 is a view in side elevation of a part of the booth, parts being broken away to show further details of construction.

Referring now to the drawings, Figs. 1, 2, and 3, the booth 11 comprises generally upper and lower shells 12 and 13, respectively. These shells are spaced apart but are in axial alignment.

The pipe 14 to be coated is supported during the spraying operation by a carrier arm 15 which is provided with a plurality of lugs 16 disposed to engage ears 17 which are suitably secured to the pipe. The upper end of the carrier 15 is provided with a flange 18 having sufficient strength to support the pipe when the flange engages a hook 19 upon the conveyor carriage 20. The conveyor carriages operate upon a track 21 above the spray booth 11. The pipe carrier 15 is brought into engagement with the carriage hook 19 by means of a loader 22 which comprises a plurality of beams 23 having sufficient strength to support the heavy pipe 14.

The loader 22 is pivoted on a trunnion 24 in such manner that it may be disposed in a horizontal position during loading. The pipe is rolled or otherwise placed upon the loader 22 and the loader is raised to a vertical position. When in the vertical position, the flange 18 engages the hook 19 and the pipe may be raised through the hood 11 by means of an elevator 25 disposed to engage the wheels 26 of the carriage 20. The pipe may then be drawn through the booth 11 for spraying.

In order to permit the carriage 20 and the carrier 15 to move to a position concentric with the spray booth, an opening 27 is provided in the upper portion 12 of the spray booth 11. Similarly, provision is made in the lower portion 13 of the booth to permit the entry of the pipe. However, the opening for the admission of the pipe is necessarily so large that it would impair the efficiency of the spray booth to leave this opening unrestricted during the spraying operation.

In order to close the gap left in the side of the lower section 13 of the booth 11, a hood segment 28 corresponding in construction to the remainder of the lower section 13 is mounted upon the end of the loader 22. Hence, when the pipe 14 is rotated to a vertical position and the carrier 15 is brought into engagement with the hook 19, the segment 28 acts as a closure for the lower section 13 of the spray booth. The edges of the segment 28 are reenforced by angle iron braces 29 (see Fig. 7). Similarly the edges of the booth cooperating with the face of the segment 28 are reenforced by angle iron braces 30.

As stated hereinbefore, the sections 12 and 13 of the hood are spaced apart. This is done to facilitate the insertion of the spray guns 31. The spray guns may be either disposed about the opening in a single tier or they may be arranged in banks of two or three guns each, depending on the conditions to be met.

The spray guns 31 operate under a relatively high air pressure, generally about 100 pounds per square inch. The discharge from the end of the guns therefore tends to create a low pressure area immediately behind the guns and if they were enclosed in a booth violent eddy currents would be set up as the air rushed into the low pressure areas. Hence, the spacing of the sections 12 and 13 a short distance from each other and the mounting of the guns in this space results in the atmosphere from outside the booth filling the low pressure areas.

If means were not provided for withdrawing the air discharged from the guns within the booth, a pressure in excess of atmospheric would be built up within the spray booth and it would be difficult to secure a uniform deposit of enamel with the eddy currents which would necessarily result. In order to withdraw air from the booth an exhausting system is provided. As shown, the booth has an exhaust outlet 32 for the lower section 13 and a similar outlet 33 for the section 12. The exhaust outlets 32 and 33 are joined in any suitable manner and are connected to an exhaust fan, not shown, for the purpose of maintaining a relatively low pressure at the outlets.

To induce the flow of air from the booth at a rate approximating the rate of its entry, the mere application of a suction current from each of the sections of the booth, however, would not suffice to procure an even distribution of the enamel on the pipe 14 during the spraying, unless means were provided within the booth to cause the currents to move in a radial direction outwardly. To this end is provided a false wall 34 in the lower section 13 of the booth and a false wall 35 in the upper section 12. The false walls comprise perforated shells spaced from the outer walls of the booth 11 and supported therein by suitable braces, as shown in Fig. 3. The walls 34 and 35 are disposed concentrically within the booth and form a chamber 37 which may be designated as the exhaust chamber.

During the spraying operation, the air and enamel mixture are discharged against the pipe 14 to be coated. The great volume of the air used in the spraying operation and that siphoned into the gap between the sections 12 and 13 of the booth by the action of the guns are contained in the chamber 38 through which the pipe 14 passes. When the exhaust fan is in operation, a relatively low pressure prevails in the exhaust chamber 37 causing the air in the chamber 38 through which the pipe passes to assume a radial movement outwardly through the perforated walls 34 and 35 into the chamber 37, thence through the exhaust outlets 32 and 33.

By causing the air to move substantially radially and by withdrawing the air at a rate approximating that of its entry, interference by the spray of one gun with that of another is greatly reduced and a more even coating of enamel upon the pipe is effected.

In order to reclaim enamel which is not deposited upon the pipe 14 as it is drawn through the booth, a trough 39 is provided at the base of the false wall 34. Thus enamel which is not drawn off through the exhaust tubes 32 and 33 settles upon the wall 34 and the outer shell of the section 13 and eventually finds its way to the trough 39 where it is drawn off through the drain pipe 40.

The operation of the guns may be observed through the opening between the sections 12 and 13 of the spray booth in which the guns 31 are disposed. In order to secure proper illumination for close inspection of the spraying operations, there is provided a plurality of electric lights 41 located within the chamber 37' at the upper end of the section 13 of the spray booth. Current is supplied to the lights 41 through the sockets 42 (see Fig. 6). Since the segment 28 attached to the loader 22 is moved completely out of engagement with the booth during the operation of rolling the pipe onto the loader, a separate wiring and illuminating system for that segment is provided. Electric light bulbs 43 are disposed in the corresponding chamber of the segment 28 and current is supplied thereto by means attached to the loader. The light bulbs 41 and 43 are protected by a window 44 arranged between the outer wall of the section 13 and the wall 34.

In order to replace light bulbs, or to repair the wiring within the lighting chambers, doors 45 are disposed conveniently about the upper end of the section 13. Light originating from the bulbs 41 and 43 is reflected upwardly toward the guns 31 so that the spraying operations may be watched by the operator. However, the window 44 might soon become clouded by the enamel mixture discharged from the guns if means were not provided to keep the glass washed. Thus a water pipe 46 having a plurality of openings is placed above the window 44 and a supply of water is discharged from the pipe to keep the window 44 clean. Similar provision in the form of a water pipe 47 is provided in the segment 28, the water being supplied separately by means, not shown, connected with the loader 22.

Figure 8:
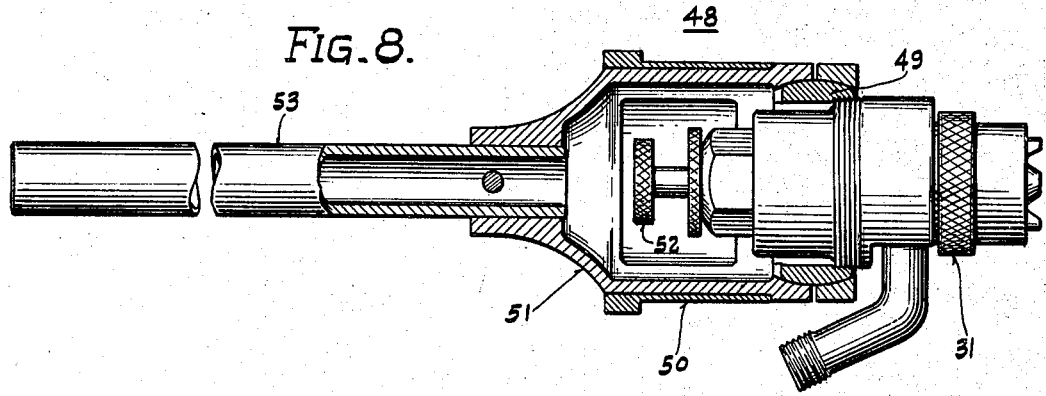
Fig. 8 is a view of a spray gun and mount, taken partly in section and partly in side elevation.
Figure 9:
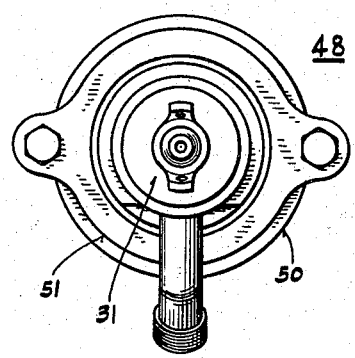
Fig. 9 is an end view of the spray gun and mount.

In order to protect the adjusting mechanism of the guns 31 from the enamel mixture within the booth 11, a gun mounting 48 is provided (see Figs. 8 and 9). The mounting also provides for angular adjustment of the guns by a ball and socket arrangement 49. A cylindrical cover 50 engaging the outer surface of the case 51 in a sliding fit protects the adjustment screw 52 of the gun 31 while said cover is in the position shown in Fig. 8. When adjustment of the screw 52 becomes necessary, the sleeve 50 may be drawn backwardly and the adjusting screw made easily accessible. The gun mounting 48 is held in position by a tube 53 which is secured to the upper shell 12 of the spray booth by means of a bracket 54.

In order to catch the water used in washing the spray booth when the enameling operations are suspended for any length of time, a tray 55 (see Fig. 1) is mounted upon a swivel 56 and is disposed to be swung beneath the spray booth 11. The tray is provided with a drain 57 connected to the drain 40 by means of which the enamel mixture and water are conveyed to a reclamation tank, not shown, to be collected and salvaged for further use.

The operation of the spray booth may be briefly described as follows:

The pipe 14, as stated above, is provided with three ears 17 welded to the end thereof preliminary to the enamel spraying operation. Lugs 16 are inserted into the openings provided in the ears 17 and engage corresponding openings in the carrier 15. The pipe is then rolled upon the loader 22 in a horizontal position. The loader 22 is then tilted upon the trunnion 24 and the flange 18 brought to a position, when the loader 22 is tilted upwardly, where it engages the hook 19 of the carriage 20. The loader 22 carries the hood segment 28 which closes the lower section 13 of the spray booth. The carriage 20 is lifted by the elevator 25 drawing the pipe 14 vertically past the spray guns 31.

The air and enamel mixture are supplied to the spray guns coincident with the operation of the elevator 25 so that when the pipe reaches the level of the guns, the enamel spraying operation commences. The spray of enamel impinges upon the pipe 14 and the air and the enamel which has not been deposited, pass into the chamber 38. The exhaust fan causes a relatively low pressure to be maintained in the chamber 37 between the perforated walls 34 and 35 and the outer walls of the spray booth 11, causing the air to move in a radial direction outwardly through the perforated walls and to be withdrawn from the chamber 38 at a rate approximating the rate at which it enters the spray booth 11. The pipe is drawn upwardly until it is past the guns 31 at which time the air and enamel mixture are shut off from the guns.

When the spraying operations are complete, the inside of the booth is washed with hoses or other suitable means, the tray 55 having been swung into position beneath the booth 11 to catch the water and enamel mixture.

It will be understood that the present description is meant to be illustrative only and is not to be construed in a limiting sense.

I claim:

1. An apparatus for use in coating pipes comprising, in combination, inner and outer shells forming a booth disposed to enclose a pipe during the coating operation, said inner shell being perforated and being spaced from the outer shell, means for supporting the inner shell in position, exhaust outlets adjacent each end of the booth, and spray guns for applying the medium to the pipe to be coated, disposed within the booth.

2. An apparatus for use in coating pipes comprising, in combination, inner and outer shells forming a booth disposed to enclose the pipe and coating means during the coating operation, said inner shell being disposed concentrically with respect to the outer shell and being perforated to facilitate the escape of the air carrying the coating medium, means at the base of the inner shell for reclaiming unused coating medium, and spray guns disposed between the ends of and directed toward the axis of the booth to coat the pipe as it is drawn through for the coating operation.

3. An apparatus for use in coating pipe comprising, in combination, two sections of inner and outer shells disposed to enclose the pipe during coating, said sections being spaced apart sufficiently to accommodate spray-gun mountings, spray guns disposed within the gap between the sections to effect even distribution of the coating upon the pipe as it passes through the booth, and means connected to each section of the apparatus for drawing off spray vapor and creating air currents conducive to uniform distribution of the coating medium.

4. An apparatus for use in coating pipes comprising, in combination, a plurality of sections of inner and outer shells disposed to enclose the pipe during coating, said sections being spaced apart to form a gap, guns for applying the coating material disposed within the gap between the sections of the apparatus, exhaust ports communicating with each section, and means connected with said ports for creating a relatively low pressure within the ports to draw off the vapor-laden air and reclaim unused coating medium.

5. An apparatus for use in coating pipes, comprising, in combination, a plurality of cylindrical sections disposed to enclose a pipe during coating, said sections being spaced apart to form a gap therebetween, spray guns disposed within the gap and directed toward the longitudinal axis of the cylinders to effect equal coating of the pipe drawn through the booth formed by the sections, a perforated inner shell disposed within each section of the booth, spaced from the outer shell, and means communicating with the space between the inner and outer shell of each booth for drawing off the air discharged from the spray guns and creating a controlled circulation of said air to minimize turbulence within the spray booth.

6. An apparatus for use in coating pipes, which comprises, in combination, inner and outer shells disposed to enclose the pipe to be coated, said shells being divided into a plurality of sections and spaced apart to form a gap, spray guns disposed within the gap so formed and arranged at intervals about the circumference of the outer shell and directed toward the axis of the booth to effect equal distribution of the coating medium upon the pipe, and means connected to the upper and lower sections for drawing off the air discharged from the spray guns in a controlled air stream to prevent turbulence within the booth and to thereby effect even distribution of the coating medium upon the pipe.

7. In an apparatus for coating pipes, in combination, a spray booth, means disposed between the ends of the booth for clamping spray guns in position, spray gun mounts in said clamps comprising swivel sockets disposed to receive the spray guns and to facilitate angular adjustment of the guns, and a sleeve for encompassing the guns rearward of the swivel sockets to protect the gun from coating medium intended to be applied to the pipe to be coated.

8. In enameling apparatus, in combination, a two-section spraying booth, the sections of the spraying booth being spaced along their longitudinal axes, spray guns disposed in the space between the booth sections, means disposed to control the movement of currents of air in the booth to cooperate in the spraying operations, and means disposed below the booth for receiving the enamel which does not adhere to the article being sprayed.

9. In enameling apparatus for coating articles with an enamel mixture, in combination, a substantially closed booth for the article to be coated, means for delivering a spray of the enamel mixture against the article to coat it, and means for withdrawing the air delivered into the booth during the spraying operation to maintain the pressure in the booth at substantially atmospheric, whereby no air currents are set up to disturb the spray of enamel mixture, said means for withdrawing the air causing it to move along radial lines in the booth away from the article on all sides.

10. In apparatus for coating articles with an enamel mixture, in combination, a booth for containing the article, a perforated false wall disposed in the booth, the perforated wall being spaced from the wall of the booth, means for directing the enamel mixture as a spray against the article, and means for drawing air from the space between the false wall and the booth for causing the air forced into the booth as a result of the spraying operation to flow along lines extending radially outward, the means for withdrawing the air and the false wall being arranged to maintain the pressure in the booth around the article being coated at substantially atmospheric, thereby protecting the enamel spray from disturbing currents of air.

11. An apparatus for use in coating tubular articles with vitreous enameling material and the like, comprising a vertical cylindrical hood having openings at top and bottom through which the article is passed during a coating operation, a plurality of spray guns disposed circumferentially of the hood to coat the article as it passes longitudinally therethrough, and means associated with the hood for withdrawing air introduced by the spraying operation and preventing air currents from interfering with the spraying operations.

12. An apparatus for use in coating tubular articles with vitreous enameling material and the like, comprising a tubular spray booth disposed for movement of the article longitudinally therethrough, one side of said booth being removable for lateral movement of the article into the booth, means for delivering an article to the booth and closing the same on all sides, means for moving the article longitudinally through the booth, and means for spraying the article with coating material during its movement through the booth.

13. An apparatus for use in coating tubular articles with vitreous enameling material and the like, comprising a tubular spray booth disposed vertically for movement of the article in a vertical direction therethrough during spraying of the coating material, said booth being constructed in an upper and lower section, spray guns arranged between said sections of the booth, a conveyor above the booth, and a hanger on said conveyor for supporting the article, said upper section of the booth being cut away at one side to receive said hanger, and said hanger being disposed to move laterally on said conveyor into said booth and then to be raised vertically by said conveyor to move the article through said booth during a spraying operation.

14. An apparatus for use in coating tubular articles with vitreous enameling material and the like, comprising a tubular spray booth disposed vertically for movement of the article in a vertical direction therethrough during spraying of the coating material, said booth being constructed in an upper and lower section, spray guns arranged between said sections of the booth, a conveyor above the booth, a hanger on said conveyor for supporting the article, said upper section of the booth being cut away at one side to receive said hanger, said hanger being disposed to move laterally on said conveyor into said booth and then to be raised vertically by said conveyor to move the article through said booth during a spraying operation, said lower section of the booth being made in two parts, one part being attached to a carriage for receiving an article to be coated and moving it into position in the booth, and means for connecting said hanger to the article when the latter has reached its vertical position in said booth.

15. An apparatus for use in coating tubular articles with vitreous enameling material and the like, comprising a tubular spray booth disposed vertically for movement of the article in a vertical direction therethrough during spraying of the coating material, said booth being constructed in an upper and lower section, spray guns arranged between said sections of the booth, a conveyor above the booth, a hanger on said conveyor for supporting the article, said upper section of the booth being cut away at one side to receive said hanger, said hanger being disposed to move laterally on said conveyor into said booth and then to be raised vertically by said conveyor to move the article through said booth during a spraying operation, said lower section of the booth being made in two parts, one part being attached to a carriage for receiving an article to be coated and moving it into position in the booth, means for connecting said hanger to the article when the latter has reached its vertical position in said booth, means for withdrawing the excess air from said booth during spraying operations, and means in said booth for withdrawing air introduced by the spraying operation radially away from the article substantially uniformly in all directions.

16. In an apparatus for applying vitreous enameling material to the outside of pipe, a cylindrical spray booth having its central axis vertical and having small openings in its ends for receiving a pipe section to be coated, means for moving a pipe section longitudinally through said booth in a vertical direction while maintaining the pipe concentric to said booth, and a plurality of spray guns in said booth arranged concentrically with respect to said pipe to direct enameling material thereagainst simultaneously throughout the circumference and progressively longitudinally thereof.

17. In an apparatus for applying vitreous enameling material to the outside of pipe, a cylindrical spray booth having its central axis vertical and having small openings in its ends for receiving a pipe section to be coated, means for moving a pipe section longitudinally through said booth in a vertical direction while maintaining the pipe concentric to said booth, a plurality of spray guns in said booth arranged concentrically with respect to said pipe to direct enameling material thereagainst simultaneously throughout the circumference and progressively longitudinally thereof, and means for removing air injected in said booth by the spraying operation and to move the air along radial lines to uniformly withdraw it from all circumferential portions of the pipe simultaneously without disturbing the spraying operation.

18. In an apparatus for applying vitreous enameling material to the outside of pipe, a cylindrical spray booth having its central axis vertical and having small openings in its ends for receiving a pipe section to be coated, means for suspending the pipe vertically from one end and moving the same longitudinally through said booth in a vertical direction while maintaining the pipe concentric to said booth, and a plurality of spray guns in said booth arranged about the circumference of the pipe and equidistant therefrom to coat the same simultaneously throughout the circumference and progressively longitudinally.

19. In an apparatus for applying vitreous enameling material to the outside of pipe, a cylindrical spray booth having its central axis vertical and having small openings in its ends for receiving a pipe section to be coated, means for suspending the pipe vertically from one end and moving the same longitudinally through said booth in a vertical direction while maintaining the pipe concentric to said booth, a plurality of spray guns in said booth arranged about the circumference of the pipe and equidistant therefrom to coat the same simultaneously throughout the circumference and progressively longitudinally, and means for removing air in radial lines outwardly from said pipe to maintain equal air pressure on all sides of the pipe and prevent disturbance of the pipe from its vertical position and movement.

ADAM ZISKA.